(12) United States Patent
Markus et al.

(10) Patent No.: US 10,502,977 B2
(45) Date of Patent: Dec. 10, 2019

(54) MEDICAL DEVICE WITH PRE-DEFINED SPACE AND RELATED METHODS

(71) Applicant: EP Global Communications, Inc., Irvine, CA (US)

(72) Inventors: David T. Markus, Irvine, CA (US);
Michael C. Hayes, Irvine, CA (US);
Arthur Back, Pleasanton, CA (US);
Victoria Tran, Pleasanton, CA (US);
Rachel Marullo, Pleasanton, CA (US)

(*) Notice: Subject to any disclaimer, the term of this patent is extended or adjusted under 35 U.S.C. 154(b) by 0 days.

(21) Appl. No.: 15/509,479

(22) PCT Filed: Sep. 22, 2015

(86) PCT No.: PCT/US2015/051321
§ 371 (c)(1),
(2) Date: Mar. 7, 2017

(87) PCT Pub. No.: WO2016/048941
PCT Pub. Date: Mar. 31, 2016

(65) Prior Publication Data
US 2017/0293158 A1    Oct. 12, 2017

Related U.S. Application Data

(60) Provisional application No. 62/053,997, filed on Sep. 23, 2014.

(51) Int. Cl.
*G02C 7/04* (2006.01)
*B29D 11/00* (2006.01)
*G02B 1/04* (2006.01)
*B29K 83/00* (2006.01)
*B29K 105/16* (2006.01)

(52) U.S. Cl.
CPC ........ *G02C 7/049* (2013.01); *B29D 11/00048* (2013.01); *B29D 11/00067* (2013.01); *B29D 11/00134* (2013.01); *G02B 1/043* (2013.01); *B29K 2083/00* (2013.01); *B29K 2105/16* (2013.01); *B29K 2995/0018* (2013.01)

(58) Field of Classification Search
CPC ... G02C 7/049; G02C 7/04–049; G02C 7/083
USPC .................. 351/159.02–159.38, 159.73, 178
See application file for complete search history.

(56) References Cited

U.S. PATENT DOCUMENTS

2014/0268024 A1* 9/2014 Pugh .................. G02C 7/048
351/159.24

* cited by examiner

*Primary Examiner* — Kristina M Deherrera
(74) *Attorney, Agent, or Firm* — Kafantaris Law Offices; Theo Kafantaris

(57) ABSTRACT

A medical device including a pre-defined space such as a geometric shape or void. In one approach, the pre-defined space provides desired rigidity and more comfort for a user. There is also provided an approach which enables engravings and accommodates electronics, mechanical objects, or other rigid or unique shapes to be embedded within a medical device such as a contact lens. When adapted to swellable substrates, the resulting swelled material can leave a gap around a perimeter of embedded structure.

10 Claims, 9 Drawing Sheets

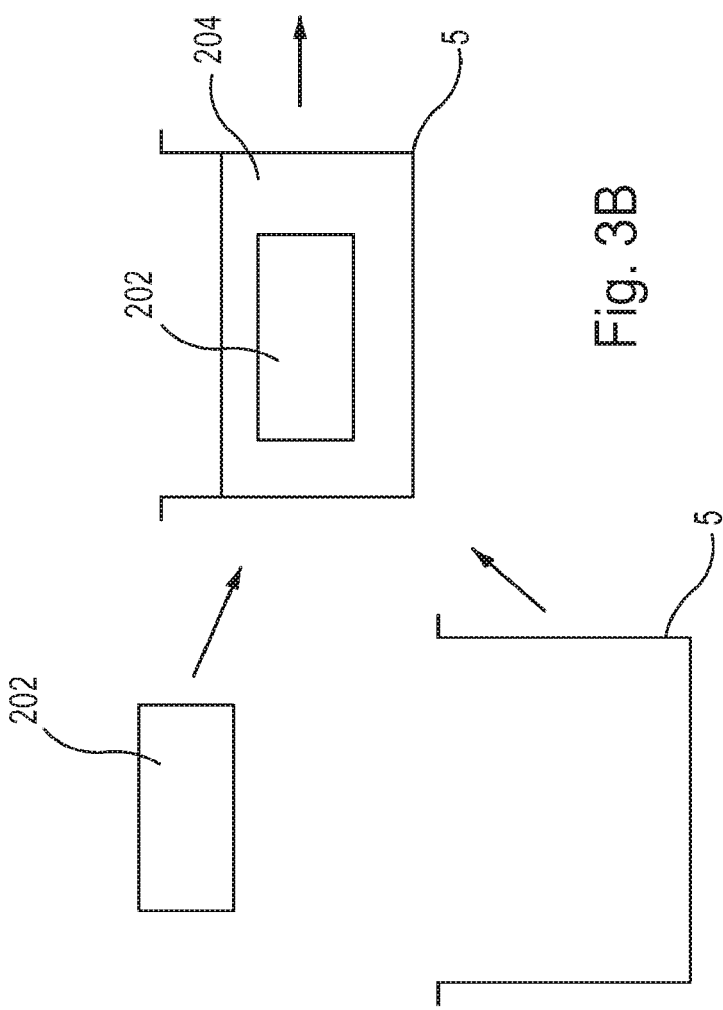

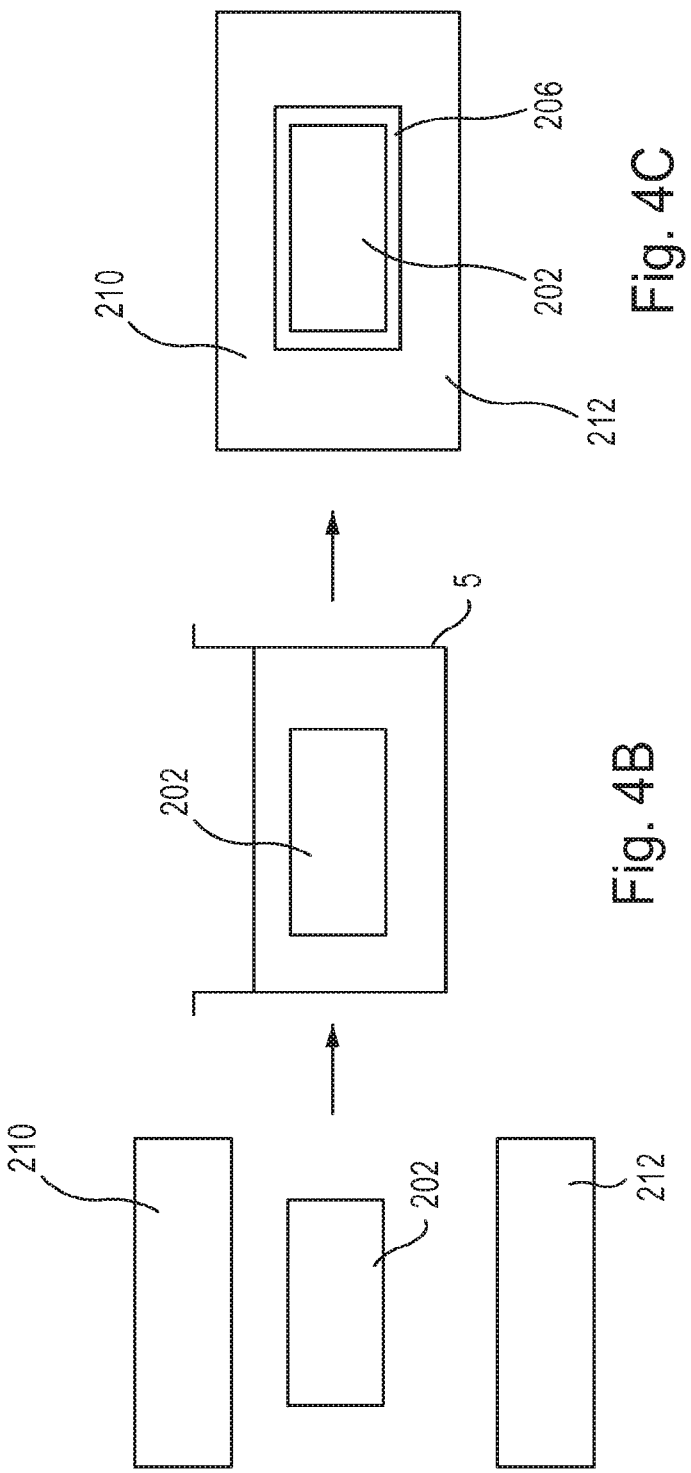

MEDICAL DEVICE WITH PRE-DEFINED SPACE AND RELATED METHODS

CROSS-REFERENCE TO RELATED APPLICATIONS

This application claims the benefit of PCT/US15/51321, filed on Sep. 22, 2015, which claims the benefit of U.S. Provisional Patent Application No. 62/053,997, filed on Sep. 23, 2014, both of which are incorporated herein by reference.

STATEMENT REGARDING FEDERALLY SPONSORED RESEARCH AND DEVELOPMENT

Not Applicable.

FIELD OF THE INVENTION

The present disclosure is directed to the creation of pre-defined spaces within materials, and more particularly, to providing a pre-determined geometric shape, void or cavity within a medical device, such as a contact lens, which can swell, flex, stretch or contract in multiple dimensions.

DISCUSSION OF RELATED ART

There are two common types of contact lenses, hard lenses and soft lenses. Hard lenses, also known as rigid gas permeable lenses (RGP lenses), are rigid contact lenses made from hard plastic or glass.

Soft lenses are often preferred over hard lenses due to their increased comfort. Soft lenses are typically made from hydrogel materials or silicone hydrogel materials. Both hydrogel contact lenses and silicone hydrogel contact lenses are flexible and can expand and contract as they absorb or lose fluid, such as water, during use or during their manufacture.

While current contact lenses are adapted to provide vision correction, little attention has been paid to providing contact lenses with a pre-defined space formed therein. The same can be said with regard to providing a pre-defined space within other medical device materials. Furthermore, more attention can be paid to creating a specific geometric shape or void within a contact lens or medical device.

Accordingly, there is a continued need for a contact lens or other medical device embodying a pre-defined geometric shape or void formed therein. The present disclosure satisfies these and other needs.

SUMMARY OF THE INVENTION

Briefly, and in general terms, the present disclosure is directed towards a medical device or a contact lens embodying a pre-defined space formed therein. This pre-defined space can be configured to receive or be filled with desirable materials or compounds. In one particular aspect, there is provided a method of creating a geometric pattern of a desired shape within a medical device such as a contact lens. Such geometric patterns can be configured to accommodate embedding engravings electronics, mechanical objects, or other rigid or unique shapes within contact lens or other medical devices. In certain approaches, a contact lens can be provided with desired vision capabilities, comfort or fit. Moreover, the medical device or contact lens embodying such structure is contemplated to be formed distortion free.

In another particular aspect, the pre-defined space can be configured such that the operation of a swellable medical device remains predictable and consistent. In another particular aspect of ophthalmic lenses, the components or objects contained in the ophthalmic lens do not cause undesired distortion or deformation should the lens flex, stretch, swell or otherwise change size or shape.

In further aspects, the components or objects placed within the pre-defined spaces of a swellable contact lens enhance, modify or extend lens function and in particular, can operate to achieve one or more of providing diagnostics or changing refractive power, focal length, light intensity, transmission control and zoom capabilities of a lens. Various lens effects are thus contemplated including controlled volume displacement, deformation, surface curvature change, thickness changes and modification of dioptric power. In order to accomplish such effects, one or more of mechanical deformation, squeezing, perimeter changes and circumferential or diametric changes can be employed. Moreover, various actuators such as electromagnetic energy, piezoelectric effects, shape memory materials or motors can be utilized. Further micro-electro-mechanical systems (MEMS), depots, and valves are also contemplated for incorporation into a contact lens to create various effects or provide specific functions, as are various other non-swellable components or other components which swell but to a different or lesser degree than a substrate of a lens.

In one approach, there is provided a medical device including a substrate having a first shape, and formed of a material that allows the substrate to change to a second shape that is different than the first shape, the substrate having a pre-defined space formed therein, and a component provided at least partially in the pre-defined space formed in the substrate, the pre-defined space being enlargeable or otherwise changes to provide a gap about the component. In another approach, there is provided a method of manufacturing a contact lens with embedded geometric patterns involving creating a geometric object having a desired shape, embedding the geometric object within a substrate material, curing the substrate material containing the embedded geometric object, swelling the material containing the embedded geometric object with a swelling agent, and creating a gap around the geometric object. In yet another approach, there is provided a method of manufacturing a contact lens with embedded geometric patterns involving creating a geometric object having a desired shape, placing the geometric object within a first contact lens mold member, filling the first contact lens mold with a lens precursor material, enclosing the geometric object and lens precursor material with a second contact lens mold member, forming a contact lens shaped cavity, curing the geometric object and lens precursor material to create a contact lens containing the embedded geometric shape, and hydrating the contact lens with a swelling agent, creating a gap around the geometric object. In one or more of the preceding approaches, structure employed to make pre-defined spaces can be eliminated, dissolved or otherwise removed from the pre-defined space after its creation. Moreover, there can be provided a medical device including a substrate that changes size from a first size, to second and third sizes, either by expanding or shrinking, and structure is provided in the substrate which accommodates such changes in size without distorting the substrate.

Additional embodiments and aspects of the disclosure will be apparent from the following description, drawings, and claims. As can be appreciated from the foregoing and following description, each and every feature described herein, and each and every combination of two or more of such features, and each and every combination of one or more values defining a range, are included within the scope of the present invention provided that the features included in such a combination are not mutually inconsistent. In addition, any feature or combination of features or any value(s) defining a range may be specifically excluded from any embodiment of the present disclosure.

DESCRIPTION OF THE DRAWINGS

Embodiments of this invention may best be understood by referring to the following description and accompanying drawings that are used to illustrate the invention. In the drawings:

FIG. 3A-C are diagrams illustrating the creation of geometric shapes through filling;

FIG. 4A-C are diagrams illustrating the creation of geometric shapes employing two sheets of substrate;

DETAILED DESCRIPTION OF THE PREFERRED EMBODIMENT

Figure 1A:
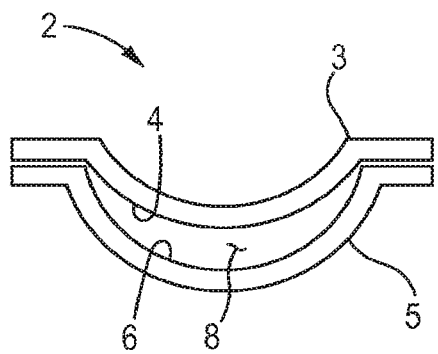
FIG. 1A is a simplified cross-sectional view of a mold useful for forming a swellable contact lens, as an example of a swellable medical device.

Embodiments of the present disclosure are described herein in the context of a pre-defined space such as a geometric pattern created within a contact lens adapted to swell, flex, stretch and contract within three dimensions. Although the present disclosure is exemplified in the context of a swellable medical device, it will be understood that the present disclosure relates to medical devices that can swell, stretch and contract within three dimensions. Some embodiments include swellable ophthalmic devices, which include swellable contact lenses (e.g., hydrogel contact lenses and silicone hydrogel contact lenses), swellable corneal onlay lenses, swellable ophthalmic implants, which may be placed in the conjunctival fornix, within the stroma of the eye, or within the anterior chamber or posterior chamber of the eye, and swellable intraocular lenses, or medical devices including diagnostic or sensing systems.

Those of ordinary skill in the art will realize that the following detailed description of the present disclosure is illustrative only and is not intended to be in any way limiting. Other embodiments of the present disclosure will readily suggest themselves to such skilled persons having the benefit of this disclosure. Reference will now be made in detail to implementations of the present disclosure as illustrated in the accompanying drawings. The same reference indicators will be used throughout the drawings and the following detailed description to refer to the same or like parts.

The present disclosure is directed towards one or more pre-defined spaces or geometric patterns provided within a swellable medical device such as a swellable contact lens. Such spaces or patterns can be adapted to accept components or objects without distortion of a substrate material, impairing desired function, vision, comfort or desired flexibility, or otherwise adapted to accommodate swelling, stretching and flexure resulting from handling including insertion, placement and removal. As used herein, swellable refers to the ability of a medical device, such as a contact lens, to absorb a liquid and increase in size by at least 5%. Swelling can occur at one or more stages during manufacture or processing of the medical device. The change in size can be a change in thickness, length, width, diameter, sagittal depth, or curvature, or changes can be regular or irregular, upon hydration or dehydration, or from folding, and the like, during manufacture or use including insertion, removal and packaging. A swellable device can be contacted with a liquid and increase in size to become a swollen device. The swollen device can be contacted with a different liquid or allowed to lose liquid to decrease in size to become a partially swollen device or dehydrated swellable device. The liquid used to swell the swellable medical device can be an aqueous liquid, such as water, buffered saline solutions (e.g., packaging solutions or cleaning solutions), or can include one or more organic solvents, which may also be mixed with water.

Electronic, micro-electro-mechanical systems, depots, voids, polymeric shapes or other components are adapted to embed into or integrate within geometric shapes or spaces formed in swellable and stretchable polymers, including contact lenses, and are further adapted to provide desired function on or within a contact lens. Moreover, it is contemplated that a contact lens embodying the disclosed electronic or other component is shaped for comfort and fit and is formed from biocompatible materials. Further, the pre-defined spaces are adapted such that they will not undesirably distort the vision correction, or prescription, of the contact lens, or undesirably affect shape for comfort, fit or function.

In one or more particular embodiments, a gap is provided between or about at least a portion or an entirety of a component placed within a substrate of a medical device or contact lens. The gap can prevent an embedded component from distorting a substrate forming a medical device when the substrate changes size or shape such as from swelling or through handling. The swelling itself can result in creating a gap or enlarging a gap about a component embedded within a substrate. The gap can further be configured to accommodate expansion or flexure of portions of the embedded component upon swelling or handling of the medical device. The pre-defined space can facilitate desired orientation of a portion of an embedded component, and gaps can be formed or generated about single or multiple dimensions of an embedded component. Further, the pre-defined space can define one or more of a slot, a square, a star, or circular or other rounded or polygonal shapes. One or a plurality of pre-defined spaces can be incorporated into a substrate, and the same can be contiguous or discrete, and can have one or more different shapes. Moreover, the pre-defined spaces can be configured to receive or be filled with desirable materials or compounds.

The term "contact lens" as used herein refers to an ophthalmic lens which is of a structure, size, shape and power that it can be worn on the cornea of an eye. The term "contact lens" can also be understood to refer to an article which upon removal from a mold needs to be treated, for example, hydrated and swelled into a lens of size, shape and power as to be wearable on an eye.

Preferably, the swellable contact lens is a hydrogel contact lens, more preferably a silicone hydrogel contact lens, or otherwise formed from material that changes shape during manufacture or processing. As used herein, a hydrogel contact lens or a silicone hydrogel contact lenses refer to contact lenses that have an equilibrium water content (EWC) of at least 10% as understood by persons of ordinary skill in the art. In certain embodiments, the swellable contact lenses have an EWC from about 15% to about 70%. In further embodiments, the swellable contact lenses have an EWC from about 25% to about 65%. In still further embodiments, the swellable contact lenses have an EWC from about 35% to about 60%. Moreover, the lenses can have a modulus of at least 0.2 MPa. For example, the contact lenses may have a modulus from 0.2 MPa to 3.0 MPa. In some In further embodiments, the contact lenses have a modulus between 0.4 MPa and 1.0 MPa.

Ophthalmic lenses manufactured using the present systems and methods may include ophthalmic lenses made from biocompatible materials. Examples of suitable materials include, and are not limited to, hydrogel polymers, silicone hydrogel polymers, as understood by persons of ordinary skill in the art. Preferably, for the manufacture of contact lenses in accordance with the present disclosure, the polymerizable composition comprises a formulation comprising one or more silicon-containing monomers and/or silicone-containing macromers. Examples of suitable contact lens formulations that may be used in the present invention include formulations having the following United States Adopted Names (USANs): etafilcon A, nelfilcon A, hilafilcon A, methafilcon A, ocufilcon A, ocufilcon B, ocufilcon C, ocufilcon D, omafilcon A, omafilcon B, balafilcon A, lotrafilcon A, lotrafilcon B, delfilcon A, galyfilcon A, senofilcon A, narafilcon A, narafilcon B, somofilcon A, riofilcon A, comfilcon A, etafilcon A, or stenfilcon A.

In some embodiments, the contact lens may comprise materials such as polyimide, kapton, parylene, SU-8, metals, ceramics, or crystals. These materials may be embedded in the contact lens.

To provide a contact lens with desired pre-defined spaces formed therein, the manufacturing process of the contact lens is to be appreciated.

The present contact lenses are preferably made by a cast molding manufacturing process. In short, a polymerizable composition, or lens formulation, is placed on a concave mold surface of a female mold half, and a male mold half is placed in contact with the female mold half such that a convex mold surface contacts the polymerizable composition and a contact lens mold assembly is formed.

Figure 1B:
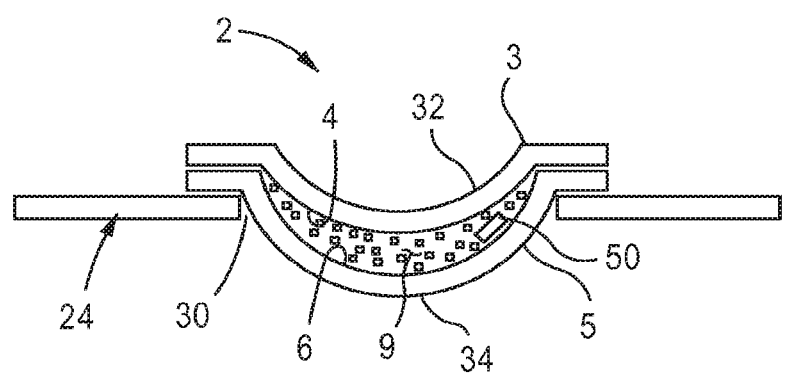
FIG. 1B is a cross-sectional view of the mold of FIG. 1 having a polymerizable composition disposed therein and being located in a tray useful in a system for making a swellable medical device.

For example, in a broad aspect, methods of manufacturing swellable medical devices, including swellable ophthalmic lenses, for example but not limited to soft silicone hydrogel lenses, are provided. Referring to FIGS. 1A-B, the methods generally include providing a mold assembly 2, such as the mold assembly 2 shown in cross section. The mold assembly 2 may include a first mold section 3 having a first lens defining surface 4 and a second mold section 5 having a second lens defining surface 6. The first and second mold sections 3 and 5 define a lens shaped cavity 8 between the first and second lens defining surfaces 4 and 6 when the first mold section 3 and the second mold section 5 are assembled together.

Turning now to FIG. 1B, a polymerizable composition 9 is provided in the lens shaped cavity 8. The polymerizable composition 9 can be understood to be a lens precursor composition. The polymerizable composition 9 can be a composition including one or more monomeric components suitable for producing contact lenses. The polymerizable composition 9 can be provided in the lens shaped cavity 8 by a number of different methods, for example, by injecting, dispensing, or otherwise introducing a polymerizable composition 9 into the lens shaped cavity.

The contemplated embedded pre-determined spaces and associated gaps can cooperate to provide desired elasticity in response to an applied pressure or force, stretching, folding, elongation, or to swelling or retracting action of material forming a contact lens, such as that occurring during use or manufacturing. One step in manufacturing a desired medical device or contact lens can be to create or select the component to be embedded prior to the creation of the contact lens.

As indicated, various components or objects are contemplated for placement within a medical device or contact lens. In addition to various contemplated geometric objects, embedded structures can include electronic components such as integrated circuits, piezoelectric components, resistors, capacitors, LEDs, amplifiers, transistors, sensors, antennas, or other electronic chips, MEMS, depots, valves, fluid filled reservoirs, or the like. The electronic components of an electronic circuit can be selected or configured to achieve, alone or in combination, one or more of changing refractive power, focal length, light intensity, transmission control and zoom capabilities of a lens. Various lens effects can include controlled volume displacement, deformation, surface curvature change, thickness changes, modification of dioptric power, controlled release of substances, or microfluidic systems. Further, the electronic components can operate or cooperate to accomplish one or more of mechanical deformation, squeezing, perimeter changes, circumferential or diametric changes, and chemical or physical sensing can be provided. Moreover, various actuators such as electromagnetic energy, piezoelectric effects, shape memory materials or motors can be utilized to facilitate such action.

The selected component or components are then placed directly onto a contact lens mold member, preferably the female mold member, or first (anterior) contact lens mold member. The placement can occur robotically and be coupled with a means of centering the assembly and structure or a means of controlling the depth of the assembly during the filling of the mold with a lens precursor material (See FIG. 2), which can be a polymerizable hydrogel or silicone hydrogel lens precursor composition.

Figure 2:
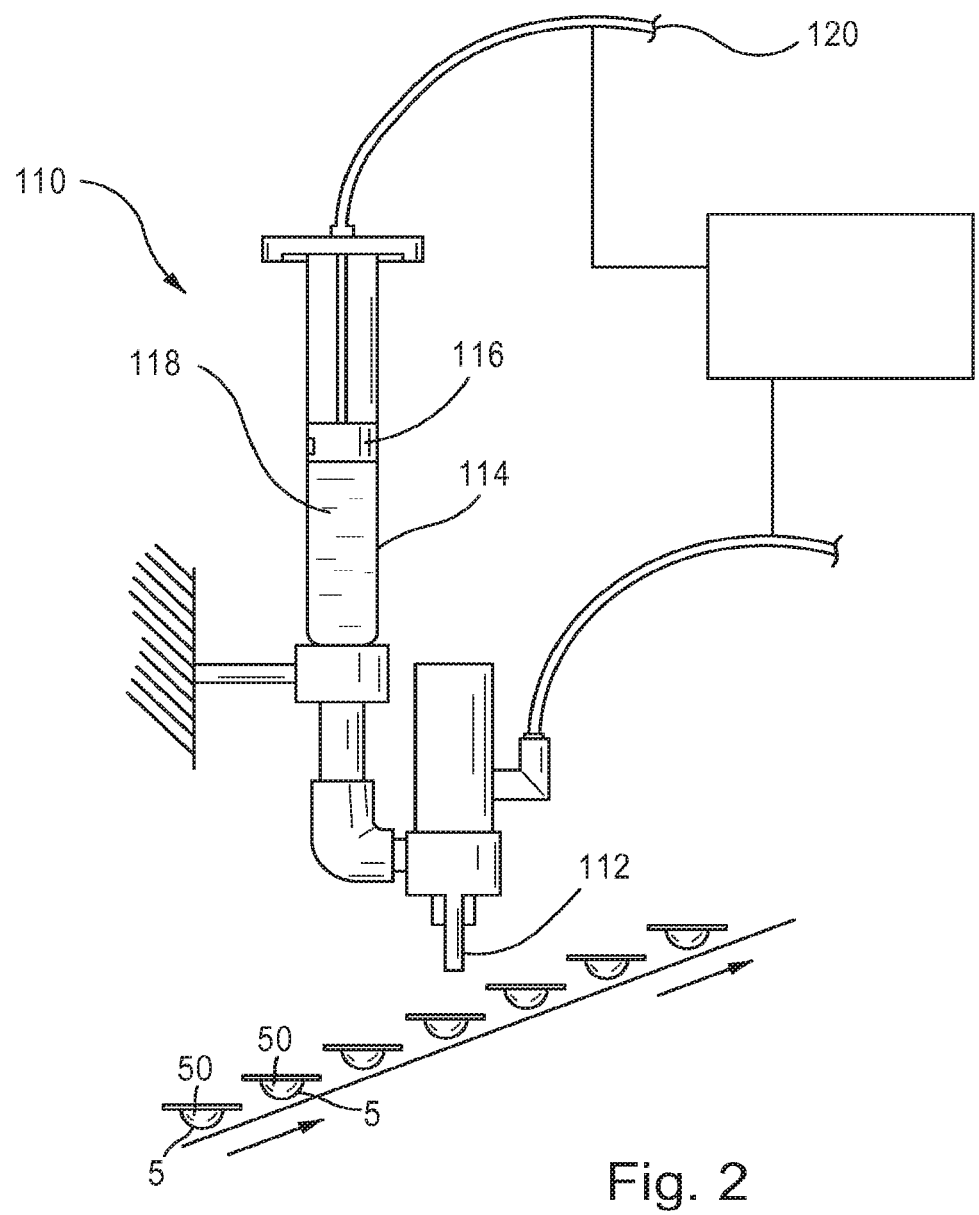
FIG. 2 is a diagram illustrating a lens precursor dispensing apparatus.

In one approach to manufacture, prior or subsequent to precise placement of the component on the concave surface of the female mold half 5, the lens precursor composition is placed on the concave surface of the first mold section. The composition can be placed on the concave surface using any conventional technique or device. However, in certain embodiments, the composition is placed on the concave surface using an automated dispensing apparatus, as shown in FIG. 2. In one approach, the automated dispensing apparatus 110 includes a dispensing tip 112 and a hollow body 114 containing the composition 118. A piston 116 is located in the body 114 to direct the composition from the dispensing tip 112. Movement of the piston 116 and the dispensing of the composition 118 can be controlled using a pressurized gas delivered via a pumping device and a conduit 120. Thus, discrete and reproducible amounts of the composition can be dispensed onto the concave surface.

The lens precursor composition or lens formulation can include monomers, macromers, polymers, crosslinkers, initiators, diluents, tinting agents, UV absorbing agents, and the like.

After placing the lens precursor composition 118 on the concave surface of the mold section, and precise placement of the component, the method can include placing a second mold section on the first mold section so that the convex surface of the second mold section and the concave surface of the first mold section form a contact lens shaped cavity. The two contact lens mold members are thus placed in contact with one another to form a contact lens shaped cavity, with the polymerizable silicone hydrogel lens precursor composition and the selected component positioned within the contact lens shaped cavity. The combination of the first mold section and the second mold section located thereon is referred to as a contact lens mold assembly. A contact lens mold assembly including an embedded component 50 is illustrated in FIG. 1B. The first and second mold sections 3, 5 of the mold assembly can be held together using a variety of techniques. For example, the mold sections can be held together by pressure applied to opposing plates contacting opposite sides of the mold assembly. Or, the mold sections can be held together by an interference fit between the first mold section and the second mold section. Or, the mold sections can be welded together.

The polymerizable compositions can then be polymerized by placing the contact lens mold assemblies in a curing oven, which may use heat or light (e.g., visible or UV light, or combinations thereof) and the like to form polymerized contact lens products. It is during manufacturing that the pre-defined geometric shapes, voids or spaces are created as is more fully described below. In approaches involving thermoplastic substrate material or other materials which do not undergo polymerization, the pre-defined geometric shapes, voids or spaces can be formed as a product of injection or other molding and curing.

The polymerization or curing of the polymer lens precursor composition is effective to form a hydrogel or silicone hydrogel contact lens. The polymerizing may involve moving the contact lens, or a plurality of contact lenses, through a curing system, (not shown) which includes a plurality of ultraviolet lamps that provide a substantially uniform and substantially constant exposure of the lens precursor composition to the ultraviolet radiation. In certain approaches, the polymerizing involves exposing the lens precursor composition to an intensity of ultraviolet radiation. Heat can also be employed in other approaches. The polymerizable lens precursor composition is thus cured to form a pre-extracted polymerized contact lens product.

The contact lens mold is then demolded, where the two mold members are separated. When separated, the polymerized contact lens product is exposed, and can reside on one of the mold halves. The pre-extracted polymerized contact lens product is next separated from the contact lens molds, or delensed. After delensing, the pre-extracted contact lens product can be washed to remove unreacted monomers, diluents, and the like.

In one particular approach, the delensed or separated contact lens product is optionally inspected for defects, and then contacted with a liquid. That is, the separated contact lens product may be placed directly in a contact lens package and contacted with a contact lens packaging solution, or the separated contact lens product may be washed to remove residual materials prior to placement in the contact lens package. The washing step can be viewed as an extraction, and it may employ the use of liquids that include aqueous solutions, organic solvents, or combinations thereof. The contact lens package containing the contact lens and the packaging solution are then sealed and sterilized.

In the commercial manufacture of silicone hydrogel contact lenses, one or more washing steps using volatile organic solvents, such as alcohol, can be used to remove unreacted or partially reacted chemicals, especially hydrophobic chemical ingredients, from the polymerized lens bodies prior to packaging. This is frequently referred to as an extraction process to remove extractable material from the polymerized silicone hydrogel contact lens product. Desired surface functionality or compatibility such as wettability can be incorporated into a lens as well. In any event, the use of volatile organic solvents facilitates removal of a component of the polymerized silicone hydrogel contact lens that has poor solubility in aqueous solutions or water. When an organic solvent, such as alcohol, is used to wash a silicone hydrogel contact lens, the contact lens increases in size or swells. For example, it is not uncommon for a pre-washed silicone hydrogel contact lens to have a first diameter, such as about 14.0 mm, and for the same silicone hydrogel contact lens to have a second diameter that is about twice as large as the first diameter after contacting the organic solvent, such as increasing to about 28.0 mm. It is also necessary to process the swollen lenses so that they return to their initial size, such as about 14.0 mm in diameter, such as by removing the alcohol using water or other aqueous solutions. It can also be appreciated that swellable contact lenses that are not exposed to organic solvents in an extraction step may swell by less than 100%, as suggested above, and they may swell upon the absorption of aqueous solutions. The swelling may result in an increase in size, such as an increase in lens diameter or lens thickness, of at least 5%. Such an increase in size can be relative to the molded size or for example, after polymerization but prior to contact with a liquid.

Thus, incorporating spaces, molds or components into a lens manufactured should take such swelling and retraction into consideration. Additionally, it is contemplated that the incorporation of the pre-determined embedded geometric shapes or voids will take into consideration swelling of the contact lens substrate, whether this occurs during manufacturing or during packaging.

After a washing process, the extracted polymerized contact lens product can be hydrated with water or an aqueous solution to form a hydrated hydrogel or silicone hydrogel contact lens. The method may involve placing the contact lens in an aqueous medium to hydrate the lens. For example, the contact lens or lenses may be placed in deionized water and the like to saturate the lens or swell the lens, such swelling occurring in multi-dimensions.

Alternatively, as stated above, washing can be accomplished by exposing the polymerized lens to water or aqueous solution free of organic solvents, which thus, also results in the lens swelling in size in multiple dimensions. In either approach, the embedded component 50 has a selected size and geometry which reacts to the swelling without causing undesirable, adverse or surprising distortion to the lens, and without causing unexpected or undesirable voids to be formed within the polymer of the lens near or adjacent to the electronic circuit.

Accordingly, the pre-extracted polymerized contact lens products and the washed polymerized contact lens products are water swellable products or elements, and the hydrated contact lens is a product or element swollen with water. Therefore, a silicone hydrogel contact lens can be understood to be a fully hydrated silicone hydrogel contact lens, a partially hydrated silicone hydrogel contact lens, or a dehydrated silicone hydrogel contact lens. A dehydrated silicone hydrogel contact lens refers to a contact lens that has undergone a hydration procedure and has subsequently been dehydrated to remove water from the lens.

Approaches are thus contemplated to create engravings, or to accommodate electronics, mechanical objects, or other rigid, non-rigid or unique shapes to be embedded within a contact lens. As shown in FIGS. 3A-C, this can be accomplished by embedding a geometric object 202 within a substrate material 204 during manufacturing, where the geometric object 202 will have a predefined geometric shape. Once the substrate material 204 has cured about the embedded geometric object 202, one or more of the previously described swelling agents or treatments can be applied to the substrate material 204, causing it to swell and expand in size. The resulting swelled substrate material 204 will leave a gap 206 around at least a portion or an entirety of the perimeter of the geometric object 202, creating a geometric pattern within the substrate material 204.

In an additional approach, a volume of lens precursor composition can be provided over the concave surface of a mold half such as by pad printing, spinning, dipping or spraying, and partially or fully polymerized to provide a polymeric-like layer (not shown). The component to be embedded can then be placed on this polymeric-like layer. An additional volume of the lens precursor composition can then be dispensed onto the coated concave surface of the mold half. As can be appreciated, with these approaches, the embedded component is "sandwiched" between the anterior and posterior surfaces of the contact lens after polymerization.

In an alternative approach (See FIGS. 4A-C), the substrate material further can include a top substrate layer 210 and a bottom substrate layer 212. Here, the geometric object 202 will be positioned between the top and bottom layers 210, 212, which are then cured together with the geometric object 202 embedded within. The swelling or other treatment agent is again applied to the top and bottom substrate layers 210, 212, causing them to swell. As with the previous approach, the swelled top and bottom layers 210, 212 will leave a gap 206 around an entirety or a portion of the perimeter of the geometric object 202, creating a geometric pattern within the top and bottom layers 210, 212.

Figure 5A:
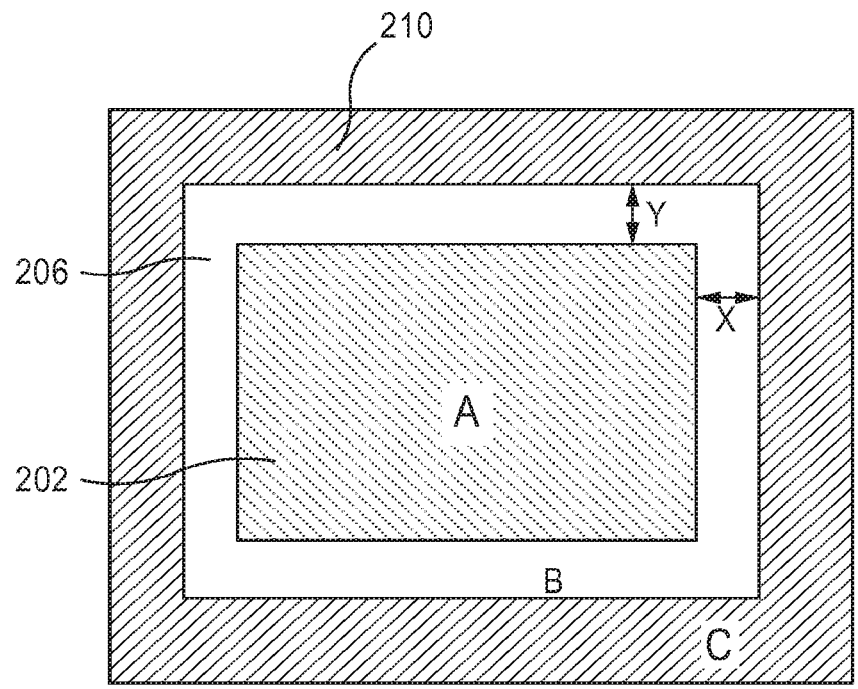
FIG. 5A-B are diagrams illustrating slot anatomy.
Figure 5B:
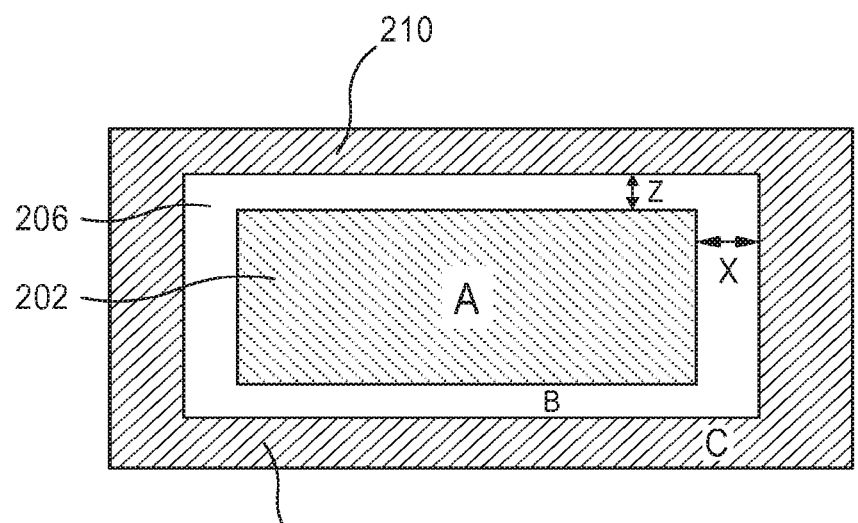
Figure 6A:
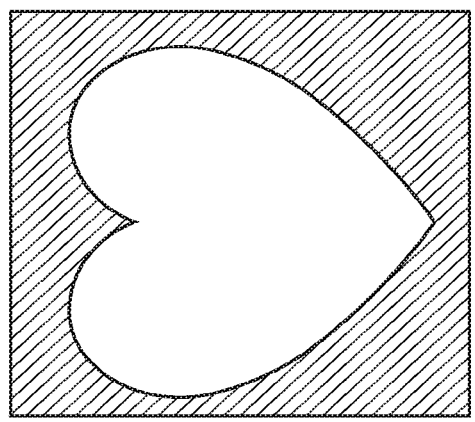
FIGS. 6A-F are diagrams illustrating various different geometric shapes.
Figure 6B:
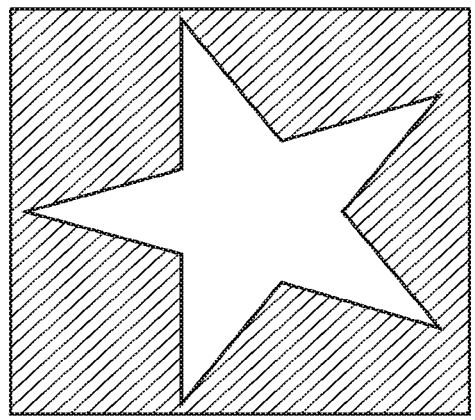
Figure 6C:
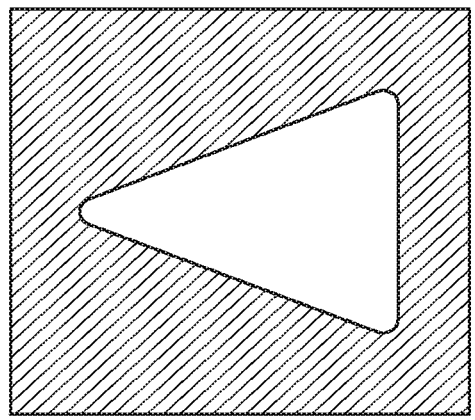
Figure 6F:
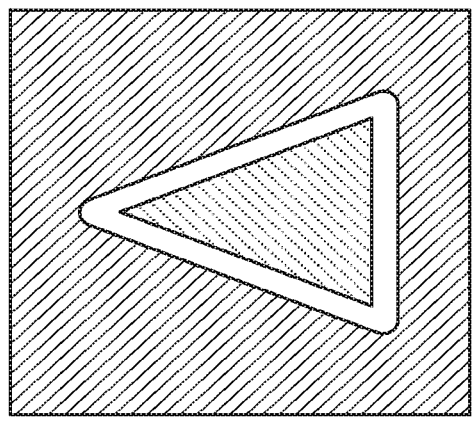
Figure 6E:
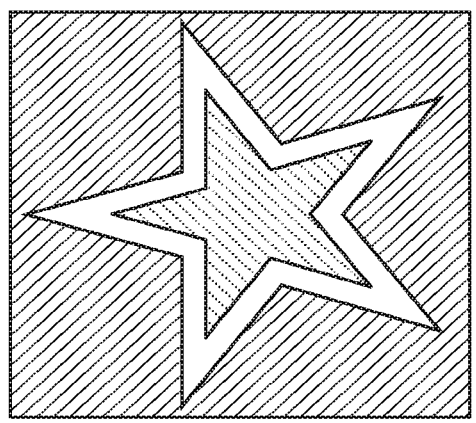
Figure 6D:
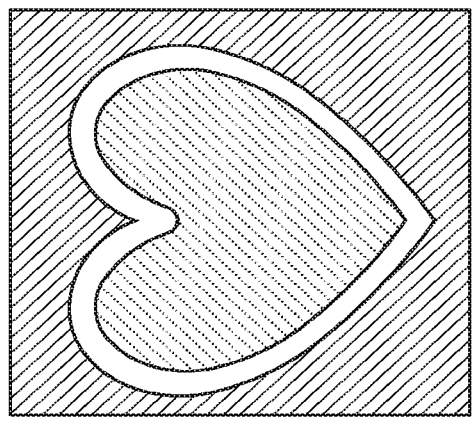
Figure 6G:
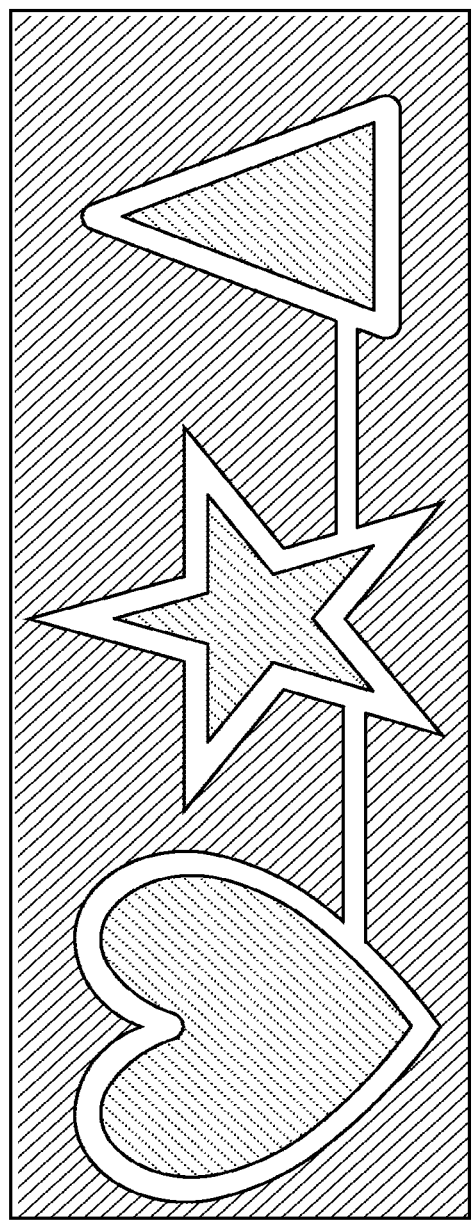
FIG. 6G is a diagram illustrating a plurality of connected geometric shapes.

When the swelling or treatment agent is applied, certain substrate materials will swell in all directions (See FIGS. 5A-B). The elongation distance is proportionate to the length of time that the substrate material is exposed to the swelling or treatment agent, and until an equilibrium is reached that is specific to the substrate material. Furthermore, it is contemplated that there must be no or minimal adhesiveness between the substrate material and the geometric object or other component placed therein, as this will prevent the gap from being created, or from being created uniformly in the desired geometric pattern. It is also contemplated that less than an entirety or just pre-selected specific portions or surfaces of the embedded structure lack this adhesiveness.

Figure 7:
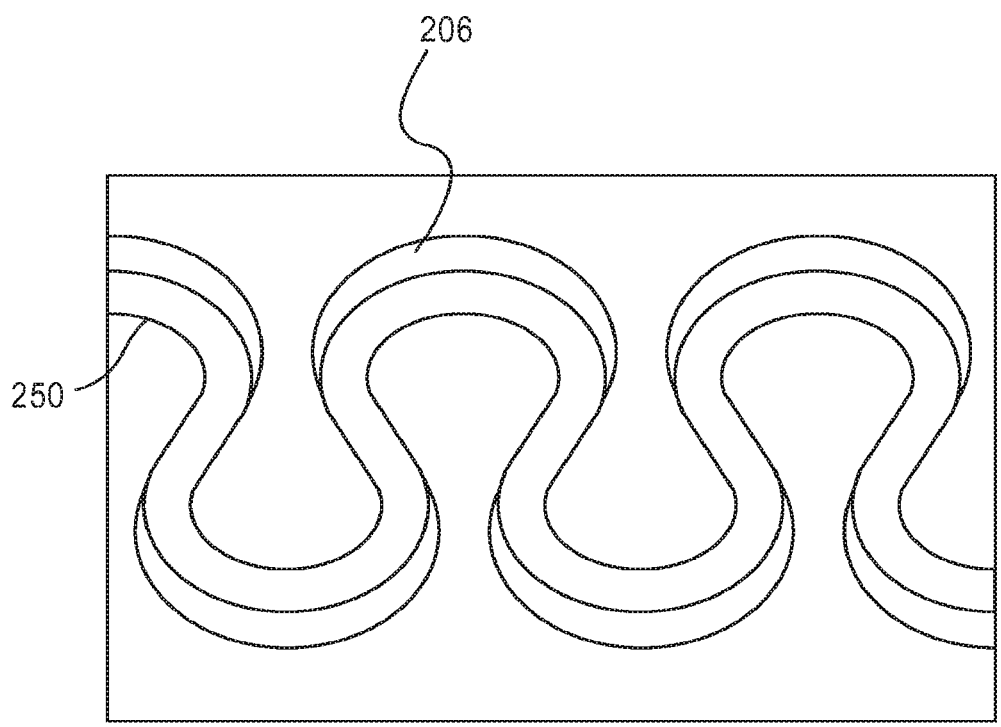
FIG. 7 is a diagram illustrating an electronic component within a substrate.

Accordingly, where the medical device is a contact lens, it is contemplated that an embedding process does not undesirably distort the vision correction, prescription, shape or function of the contact lens, or components placed therein. Where the swelling agent is acetone, certain substrate material can be caused to swell and remain swollen after the swelling agent is removed. In one specific aspect, the geometric object can be dissolvable. In an alternative embodiment, the geometric object can be dissolved by heat and can embody a thermo-decomposable material such as poly-butylnorbornene. In still further aspects, the geometric object can be rigid and adapted to withstand high temperatures commensurate with the substrate material curing process below. FIGS. 6A-F illustrate various geometric patterns that may be used with a geometric object, although any suitable geometric patterns may be used. Accordingly, although a myriad of shapes are contemplated including slots, squares, rounded or circular shapes, the figures depict star, triangular and heart shapes. In an alternative embodiment (See FIG. 7), components 250 of an electronic circuit may be embedded as opposed to a geometric object, where the electronic component circuit may have rigid elements and elastic elements and may further include MEMs, antennas, resistors, capacitors, LEDs, amplifiers, transistors, and other electronic chips. In a further alternative embodiment, mechanical elements, such as suspension elements or motors, may also be embedded instead of the geometric object, and the embedded object can be swellable or non-swellable.

In yet a further contemplated aspect, a geometric object can embody a dissolvable material adapted to withstand the temperature of the curing process. After the swelling agent is applied to the substrate material, leaving a gap around the geometric object, a dissolving agent is applied to the substrate material. The dissolving agent will permeate through the substrate material to the gap where the dissolvable geometric object remains. The dissolving agent will then dissolve the dissolvable geometric object, leaving no rigid structure within the substrate material. The product of the dissolution can then permeate back through the substrate material, leaving an empty void within the substrate material. Moreover, the geometric object can embody a thermo-decomposable material adapted to decompose as the temperature of the curing process reaches a decomposition temperature, leaving a void after curing.

The methods of manufacturing the present contact lenses can also include a step of packaging the contact lens. For example, the contact lens can be placed in a blister pack or other suitable container that includes a volume of a liquid, such as a saline solution, including buffered saline solutions. The lens substrate will swell and shrink during manufacture and use, and will generally have a curved or hemispherical shape.

In one or more embodiments, there is provided a medical device, comprising a substrate having a first shape, and formed of a material that allows the substrate to change to a second shape that is different than the first shape, the substrate having a pre-defined space formed therein and a component provided at least partially in the pre-defined space formed in the substrate, wherein the pre-defined space can enlarge to provide a gap about the component. The substrate is configured to be swellable, and is formed from a material that allows the substrate to swell from a first size to a second size. A gap can be provided between an entirety of the component and the substrate. The pre-defined space can be configured to prevent the component from distorting the substrate when the substrate changes shape and can be configured to create a functional space. The substrate can swell to create a gap about the component. The pre-defined space can enlarge upon swelling of the substrate. The pre-defined space can accommodate expansion or flexure of portions of the component upon swelling of the medical device and can facilitate desired orientation of portions of the component upon the medical device changing shape. The pre-defined space can accommodate the component such that upon swelling of the substrate, the substrate forms a pre-determined shape without distortion. The gap can be formed along a single dimension of a portion of the component or can be formed along multiple dimensions of a portion of the component. The component can be fully contained within the pre-defined space, and the pre-defined space can be a slot. The component can be swellable, the substrate can be swellable and the component is non-swellable, or the component is swellable and the substrate is swellable, and the component swells less than the substrate. The substrate can include a plurality of discrete, spaced pre-defined spaces each configured to selectively receive a portion of the component. The component can be a non-swellable structure. The plurality of discrete, spaced pre-defined spaces can have the same shape, or the plurality of discrete, spaced pre-defined spaces have one or more different shapes. The substrate can include a plurality of connected pre-defined spaces. The substrate is formed from a hydrogel polymer, or can be formed from a thermoplastic or non-reactive material. Moreover, the component can be an electronic component and the medical device can be a contact lens.

In one or more methods of manufacturing a contact lens with embedded geometric patterns, the method comprises creating a geometric object having a desired shape; embedding said geometric object within a substrate material; curing said substrate material with embedded geometric object; and swelling said substrate material with embedded geometric object with a swelling agent, creating a gap around said geometric object. The substrate material can further comprises a top layer and a bottom layer, wherein said geometric object is embedded between said top layer and said bottom layer, wherein said top layer and said bottom layer are cured together about said geometric object. The geometric object can be rigid, an electronic component, or can be a mechanical device. The geometric object can further comprise a dissolvable material adapted to withstand the temperature of said curing, wherein a dissolving agent is applied to said substrate material, said dissolving agent permeates through said substrate material, and said dissolving agent dissolves said dissolvable geometric object, leaving no rigid structure within said substrate material. The product of said dissolution can permeate back through said substrate material, leaving a void within said substrate material. The geometric object can also further comprises a thermo-decomposable material adapted to decompose as the temperature of said curing process reaches a decomposition temperature, leaving a void after curing.

In another approach to a method of manufacturing a contact lens with embedded geometric shapes, the method comprises creating a geometric object having a desired shape; placing said geometric object on a first contact lens mold member; filling said first contact lens mold with a lens precursor material; enclosing said geometric object and lens precursor material with a second contact lens mold member, forming a contact lens-shaped cavity; curing said geometric object and lens precursor material to create a contact lens with embedded geometric shape; demolding said contact lens; delensing said contact lens; extracting said contact lens; and hydrating said contact lens with a swelling agent, thereby creating a gap around said geometric object. The geometric object can be rigid, an electronic component, or a mechanical device. The geometric object can further comprise a dissolvable material adapted to withstand the temperature of said curing, wherein a dissolving agent is applied to said contact lens, said dissolving agent permeates through said contact lens, and said dissolving agent dissolves said dissolvable geometric object, leaving no rigid structure within said contact lens. The product of said dissolution permeates can back through said contact lens, leaving a void within said contact lens. The geometric object can also further comprise a thermo-decomposable material adapted to decompose as the temperature of said curing process reaches a decomposition temperature, leaving an empty void after curing.

Accordingly, there has been provided a medical device having a pre-defined space formed therein and methods for producing the same. The pre-defined space formed within swellable and stretchable medical devices are adapted to provide desired elasticity in multiple dimensions alone, or about an embedded component.

While the above description contains specific details regarding certain elements, sizes, and other teachings, it is understood that embodiments of the disclosure or any combination of them may be practiced without these specific details. Specifically, although shapes and orientations are designated in the above embodiments, any shape and orientation may be used so long as it adequately performs as intended. These details should not be construed as limitations on the scope of any embodiment, but merely as exemplifications of the presently preferred embodiments. In other instances, well known structures, elements, and techniques have not been shown to clearly explain the details of the disclosure.

Moreover, while this disclosure has been described with respect to various specific examples and embodiments, it is to be understood that the same is not limited thereto and that it can be variously practiced within the scope of the following claims.

What is claimed is:

1. A contact lens device, consisting of:
   a contact lens material having a pre-defined space formed therein, said contact lens material consisting of hydrogel polymer, said pre-defined space formed from a geometric object having a desired shape embedded within said contact lens material; and
   a component provided in said pre-defined space formed in said contact lens material, wherein the surfaces of said component are naturally non-adhesive, wherein the pre-defined space can enlarge around and outside of said component to provide a gap between said contact lens material and said component and wherein said naturally non-adhesive surface of said component enables said gap to be created.

2. The contact lens device of claim 1, wherein the contact lens material is configured to be swellable, and is formed from a material that allows the contact lens material to swell from a first size to a second size.

3. The contact lens device of claim 1, wherein the pre-defined space is configured to prevent the component from distorting the contact lens-material when the contact lens material changes shape, and wherein said natural non-adhesiveness prevents said distortion by preventing said component from sticking to and distorting said contact lens material.

4. The contact lens device of claim 1, wherein the pre-defined space is configured to create a functional space.

5. The contact lens device of claim 1, wherein the pre-defined space facilitates desired orientation of portions of the component upon the contact lens device changing shape.

6. The contact lens device of claim 1, wherein the component is swellable.

7. The contact lens device of claim 1, wherein the contact lens material is swellable and the component is non-swellable.

8. The contact lens device of claim 1, wherein the component is swellable and the contact lens material is swellable, and the component swells less than the contact lens material.

9. The contact lens device of claim 1, wherein the contact lens material includes a plurality of discrete, spaced pre-defined spaces each configured to selectively receive a portion of the component.

10. The contact lens device of claim 1, wherein the contact lens material includes a plurality of connected pre-defined spaces.

\* \* \* \* \*